Aug. 29, 1972   P. M. MacLEAN ET AL   3,687,765
METHOD FOR THERMALLY INSULATING PIPE
Filed May 11, 1970   2 Sheets-Sheet 1
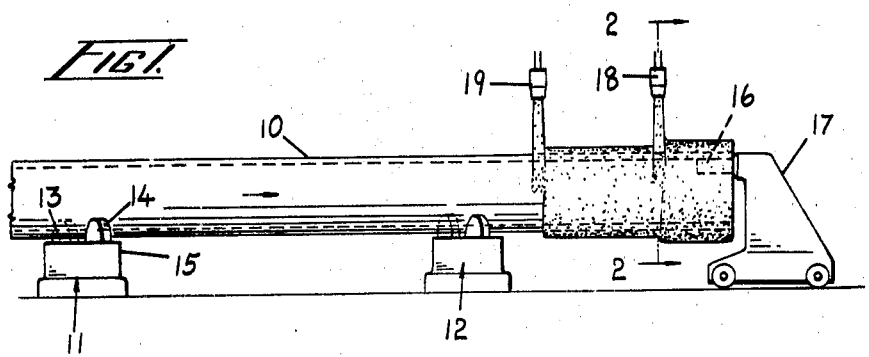
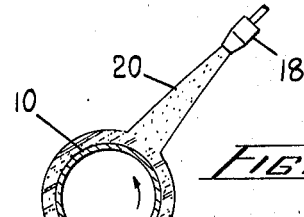
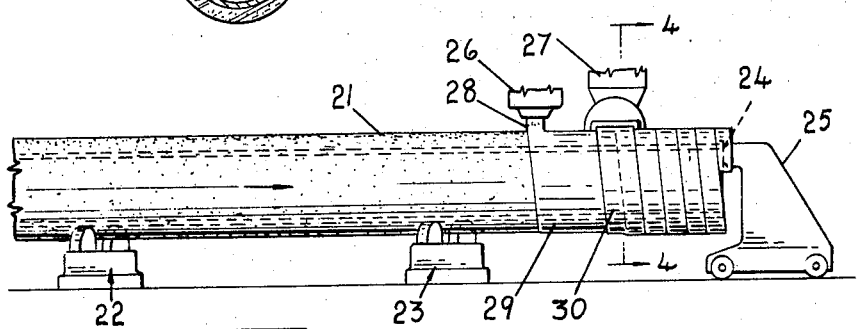
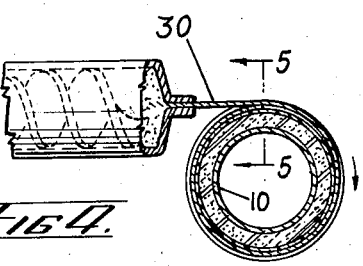
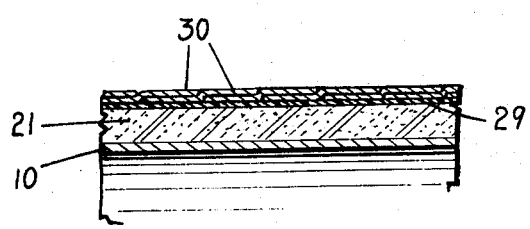
Inventors
Peter M. Maclean
Leslie E. Shaw
Harold Jarvis
By Maybee & Legris
Attorneys Aug. 29, 1972   P. M. MacLEAN ET AL   3,687,765

METHOD FOR THERMALLY INSULATING PIPE

Filed May 11, 1970   2 Sheets-Sheet 2

Inventors
Peter M. Maclean
Leslie E. Shaw
Harold Jarvis

By Maybee & Legris
Attorneys

United States Patent Office 3,687,765
Patented Aug. 29, 1972

3,687,765
METHOD FOR THERMALLY INSULATING PIPE
Peter M. Maclean, Willowdale, Ontario, Leslie E. Shaw, Etobicoke, Ontario, and Harold Jarvis, Moffat, Ontario, Canada, assignors to Shaw Pipe Industries Ltd., Rexdale, Ontario, Canada
Filed May 11, 1970, Ser. No. 36,354
Claims priority, application Canada, May 17, 1969, 051,864
Int. Cl. B65h 81/02
U.S. Cl. 156—187
22 Claims

ABSTRACT OF THE DISCLOSURE

A thermally insulating coating is formed on a steel pipe by rotating the pipe slowly about a horizontal axis while spraying a urethane foam mix onto the upper surface of the pipe, the spray traversing the length of the pipe to build up a uniform layer of polyurethane foam. The pipe surface is maintained at the reaction temperature. An outer sheath of polymeric resin, such as high density polyethylene, is subsequently provided by helically winding a ribbon of the resin onto the coated pipe. The ribbon is extruded in a hot plastic condition and applied directly to the coated pipe after a mastic insulating layer has been formed on the latter.

---

This invention relates to a method for applying a tough thermally insulating coating to a metal pipe. The method described herein is especially suitable for applying thermal insulation to steel pipe sections which are to be assembled to form pipelines for natural gas and oil. It will be appreciated, however, that the method is generally applicable to the coating of straight pipe sections which may be used in other applications.

In the case of an oil pipeline, it is frequently necessary to provide thermal insulation to prevent heat loss from the oil which would increase its viscosity and so place an excessive demand on the oil pumping equipment. Besides providing an insulating coating, it is usually necessary to provide a tough outer casing or sheath to protect the insulation during handling and installation of the pipe section, and to prevent ingress of moisture and bacteria which would cause deterioration of the insulating material.

In one existing method of coating a pipe section, a foamed plastic material is moulded directly onto the pipe surface.

This is achieved by means of a stationary box-like mould through which the pipe extends, the mould being moved stepwise along the pipe as successive batches of the foamed plastic material are moulded onto successive lengths of pipe. A thermally insulating layer of mastic is applied to the coated pipe, which is next fed through a moulding unit at which a polyethylene sheath is extruded from an annular die onto the pipe. This existing method has the limitation that any given mould box and sheath moulding unit will serve for only one diameter of pipe and for only one thickness of the foamed layer. Where different pipe diameters or different insulation thicknesses are concerned, it is necessary to provide mould boxes and units of different dimensions. Moreover, difficulties are encountered when this method is applied to pipes of larger diameter, say three or four feet.

It is an object of the present invention to provide a method of coating a pipe with insulation, which method is readily applicable to pipes of different diameters and is especially suitable for larger diameter pipes.

According to the invention a tough thermally insulating coating is formed on a metal pipe by rotating the pipe at a uniform speed about a substantially horizontal axis while spraying a urethane foam mix onto the upper surface of the pipe from a spray nozzle located above the axis, the pipe surface being maintained at a temperature at which the mix constituents will react to form the desired foamed insulation, traversing the spray along the length of the pipe to build up a uniform layer of polyurethane foam enveloping the length of pipe traversed, curing the polyurethane foam, and sheathing the coated pipe in a layer of tough polymeric material such as, for example, high density polyethylene.

The term "urethane foam mix" as used herein means a mixture of components, namely an isocyanate component and a resin component, which will react together at an appropriate temperature to form a foamed polyurethane resin. The components are fed separately under pressure and at a suitable reaction temperature to a spray nozzle, where they are mixed immediately before being sprayed.

The mix may be sprayed by one or more spray nozzles. Each nozzle is positioned so as to direct the spray onto an upper region of the pipe surface in a generally radial direction (i.e. in a direction approximately normal to the pipe surface), preferably from an angle of at least 45° to the horizontal.

Although the method of the invention is intended primarily for coating metal pipes, especially steel pipes, it may be used for coating non-metallic pipe surfaces to which the polyurethane foam will readily adhere and on which it can be built up into a uniform layer.

In a preferred embodiment of the invention, the outer sheath is formed by first depositing a thermally insulating layer of a self-sealing mastic in a hot viscous state onto the polyurethane foam layer, and then applying an outer layer of the polymeric resin in the hot plastic state to the hot mastic layer, the outer layer setting to form a tough outer sheath bonded to the mastic. Preferably, the resin is extruded as a continuous ribbon and wound helically onto the mastic layer, with some overlap, to form a continuous wrapping.

The mastic used in a preferred form of the present invention is an ethylene-propylene-rubberised asphalt composition including a clay viscosity modifier, plasticisers, lubricant, antioxidant and a bacteriocidal agent. The composition is capable of cold flow, and is therefore self-sealing. Applied to the polyurethane foam coating in the molten state it acts as a thermal insulator and protects the foam from damage and deterioration due to the application of the outer sheath at a temperature higher than the foam can withstand directly. The mastic also exhibits a strong bacteriocidal action, high dielectric strength, and impermeability to moisture. Numerous other mastic compositions which may be used for the purpose in question, are well known in the art. For example such mastic compositions are described in Canadian Pat. No. 669,611, U.S. Pats. 3,012,585 and 3,211,598, all in the name Harold C. O'Brien and issued on Sept. 3, 1963, Dec. 12, 1961 and Oct. 12, 1965, respectively.

One method in accordance with the invention will now be described by way of example with reference to the accompanying diagrammatic drawings, in which:

FIG. 1 illustrates a first stage of the method, in which an insulating layer is being applied to a pipe;

FIG. 2 is a section on line 2—2 in FIG. 1;

FIG. 3 illustrates a second stage of the method in which an outer sheath is being applied to the insulating layer;

FIG. 4 is a section on line 4—4 in FIG. 3;

FIG. 5 is a longitudinal sectional view on line 5—5 in FIG. 4 in its final form;

Figure 6:
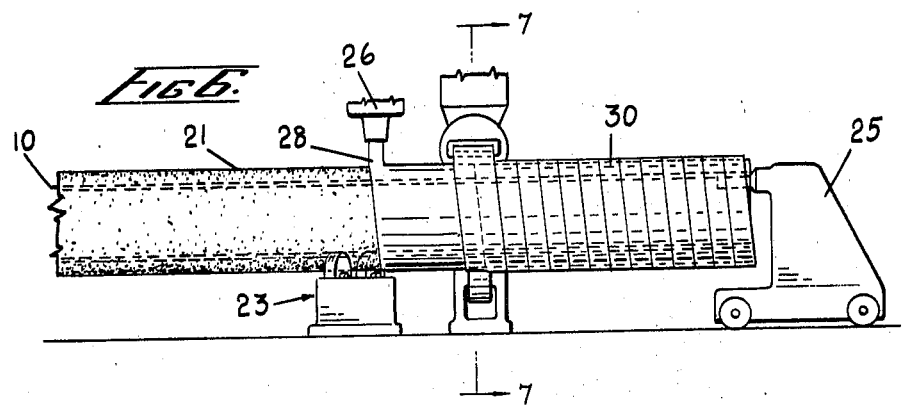
FIG. 6 is a view corresponding to FIG. 3, illustrating a modification of the second stage.

The pipe 10 shown in FIG. 1 is a straight steel pipe of about 4 feet in diameter to be used in the construction of an oil pipeline. The construction of the pipeline itself does not form part of the present invention, but it may be mentioned that in accordance with normal practice a plurality of such pipes after being coated with insulation material to within a short distance of their ends, are butt welded together at the site to form an extended line. The annular gaps in the insulation at the joins are filled by pairs of semiannular foamed plastic filling pieces, which are retained in place in the final assembly by tough sleeves which are shrink-fitted onto the joins.

In order to insulate the pipe, it is first placed with its axis substantially horizontal on at least two drive asssemblies 11, 12 as indicated in FIG. 1. Each drive assembly comprises a pair of rubber-tired wheels 13, 14 whose axes are offset and parallel, the wheels being mounted in a turntable 15 and being driven from an electric motor through reduction gearing. The axes of the wheels are horizontal and slightly inclined to the pipe axis according to the orientation of the turntable. The pipe bears on the wheels which engage it frictionally. It will be seen that as the wheels are driven by the motors, they rotate the pipe slowly about its horizontal axis and simultaneously feed the pipe in the direction of its axis. Typically, and in the present example, the pipe is rotated at a uniform speed of about 3 or 4 r.p.m. and advanced axially at the rate of 3 inches per revolution. When the leading end of the pipe 10 reaches a certain position, it is supported on a mandrel 16 carried by a wheeled trolley 17, the mandrel and trolley then being positioned to take the weight of the pipe at one end and advance with the pipe end. A crane (not shown) engages the rear end of the pipe before it leaves the last drive assembly 12.

As the pipe is slowly rotated and advanced, a urethane foam mix is sprayed onto the upper surface of the pipe from a spray nozzle 18 located at a position higher than the pipe. In order to deliver the foam mix at a greater rate and so permit a more rapid speed of advance for the pipe, one or more additional spray nozzles such as 19 may be provided. The nozzle 18, (or each nozzle 18, 19) should be positioned about 5 feet from the pipe surface and oriented so as to direct a spray 20 in a generally radial direction at an angle of at least 45° to the horizontal. The pipe surface is maintained at a temperature in the range 115°–140° F., ideally in the range 125°–130° F. The spray leaves the nozzle at about the same temperature, and so the ambient temperature should not be so low as to cause substantial cooling of the sprayed mix prior to reaching the pipe surface. An ambient temperature of about 60° F. or higher is quite suitable, but temperatures below 40° F. should be avoided.

Successful results have been obtained using a static mix spray gun apparatus of the type sold by Gray Company, Inc. of Minneapolis, U.S.A., under the trade term "Portable Heated Hydra-Cat." In this apparatus the urethane foam mix components, namely an isocyanate component and a resin component, are fed separately and in equal proportions to the spray nozzle where they are mixed prior to being sprayed. The components are fed under a pressure of 650–800 p.s.i. and at temperatures of about 140° F.–160° F. respectively; the mix is sprayed at a temperature in the range 115° F.–140° F., preferably 125°–130° F.

By this method uniform layers of polyurethane foam of up to 6 inches thick and having a density of 3.9 to 4 lbs./cu. ft. have been built up on the surfaces of pipes.

The best results have been obtained using the following foam mix constituents:

Isocyanate component—methylene-bis-(4-diphenyl diisocyanate) sold under the trademark "Suprasec DN" by C.I.L.

Resin component—

(i) dibutyltin dilaurate (catalyst); 0.14%
(ii) trichlorofluoromethane sold under the trademark "Freon 11" (blowing agent); 30%
(iii) polyoxyalkylene-polydimethyl siloxane block polymers (surfactor); 0.5%
(iv) the polyether sold under the trademark "Resin 207X" by C.I.L. (resin); remainder In general, however, satisfactory results can be obtained using the following mix constituents:

Isocyanate component: Polylene diisocyanate, or methylene-bis-(4-diphenyl diisocyanate)

Resin:

(i) catalyst 0.1–0.2%
(ii) blowing agent 20%–50%
(iii) surfactor (water soluble silicone)—0.1–2.0%
(iv) resin (polyol, namely a polyester or polyether)— remainder.

The foam mix on the pipe surface exhibits a cream time of about 3 seconds and a rise time of about 5 seconds. The tack free time, load holding time, and cure time are about 15 seconds, 15 minutes, and 2 hours, respectively.

In the second stage of the method according to the invention, the pipe 10, bearing a uniform layer 21 of cured polyurethane foam, is placed on a set of drive assemblies 22, 23, which operate in the same way as the drive assemblies 11 and 12 of FIG. 1 to rotate the pipe slowly at a uniform speed while advancing the pipe uniformly in the direction of its axis. The leading end of the pipe 10 is engaged and supported by a mandrel 24 carried by a trolley 25, as described with reference to FIG. 1. As the drive assemblies rotate the pipe each part of the coated surface of the pipe passes under a nozzle 26 at a first station, and alongside an extrusion machine 27 at a second station. A mastic composition 28 is deposited onto the polyurethane layer 21 at a temperature in the range 270°–330° F. to form a uniform heat insulating layer 29 of about 10 to 15 mils thick enveloping the polyurethane layer. The mastic composition, in the present example, consists of ethylene-propylene-rubberised asphalt with a clay viscosity modifier, plasticisers, lubricant antioxidant and bacteriocidal agents.

While the mastic is in a hot viscous state, a continuous ribbon 30 of high density polymeric resin, is extruded from the extrusion machine 27 and applied directly to the mastic layer. The ribbon is extruded at a temperature in the range 400° F.–650° F., preferably in the range 500° F.–550° F., which is considerably higher than that which the polyurethane foam layer would tolerate without the intermediate mastic insulating layer 29. The ribbon is preferably about 18 inches wide, and 60 to 100 mils thick, although it may be from 20 to 200 mils thick. The ribbon 30 is would helically onto the mastic layer, and if the pipe is advanced at the rate of nine inches per revolution, a 50% overlap of successive turns of ribbon is obtained. As the resin sets, it becomes bonded to the mastic layer and the overlapping parts of the ribbon become bonded together, forming a tough resilient outer sheath. The structure of the coating pipe is illustrated in section in FIG. 5.

The polymeric resin is preferably a high density polyolefin resin, and in particular a commercial grade of resin selected from one or more of the following homopolymers and copolymers thereof: high density polyethylene; high density polypropylene; high density poly-4-methyl pentene-1, and high density poly-1-hexene. In the case of copolymers, from 1–10% by weight of a copolymerisation material such as acrylic acid or methyl methacrylate would normally be incorporated. Inorganic pigments would also normally be included, up to 2% by weight depending on the colouring agent used, for both homopolymers and copolymers in accordance with conventional practice.

Figure 7:
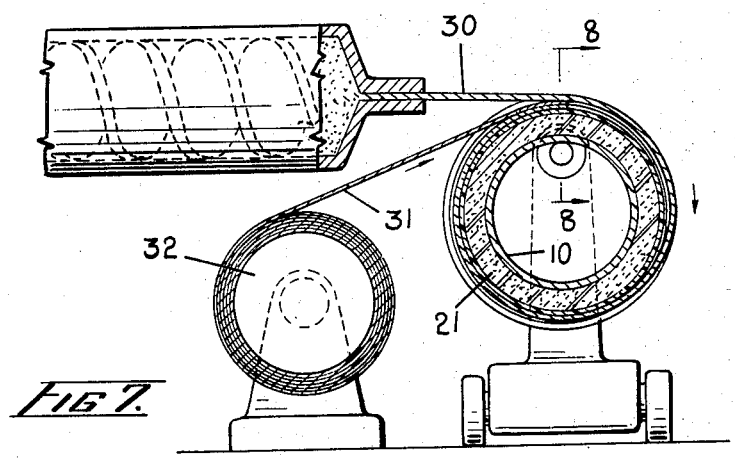
FIG. 7 is a section on line 7—7 in FIG. 6.
Figure 8:
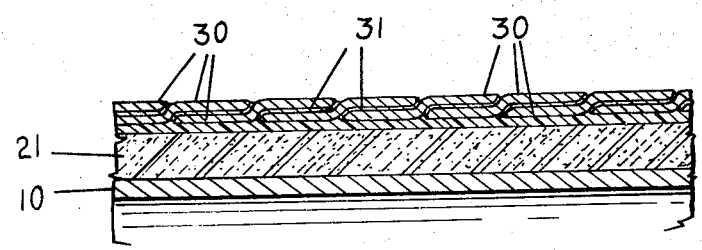
FIG. 8 is a longitudinal section on line 8—8 in FIG. 7.

FIGS. 6 and 7 illustrate the second stage of a slightly modified method; FIG. 8 is a view corresponding to FIG. 5 of the end product of the modified method. In these figures the parts corresponding exactly to similar parts shown in FIGS. 1 to 5 are denoted by the same reference numerals and will not be described again. The only difference between this method and the method previously described is that a second ribbon 31 is interleaved with the ribbon 30 during the final wrapping process. The ribbon 31 is a relatively thin ribbon of about half the width of the ribbon 30. It is payed out from a drum 32 onto the rotating pipe, where it is helically wound to form the structure illustrated in FIG. 8. The ribbon 31 is a low density copolymer, or ionomer, which is melted between the hot layers of the ribbon 30, the ribbons subsequently setting to form a very strongly bonded unitary structure. Alternatively the ribbon may be a copolymer treated to provide a degree of cross linkage, whereby to provide an improved bond between the overlapping layers when set. Examples of such copolymers are mentioned in U.S. Pat. No. 3,272,912, issued to L. Jachimowicz on Sept. 13, 1966, and U.S. Pat. Nos. 3,233,036, 3,987,501 and 3,027,346.

What we claim as our invention is:

1. A method of forming a tough thermally insulating coating on a pipe, which method comprises rotating the pipe at a uniform speed about a substantially horizontal axis while spraying a urethane foam mix onto the upper surface of the pipe from a spray nozzle located above the axis, traversing the spray along the length of the pipe to build up a uniform layer of polyurethane foam enveloping the length of pipe traversed, curing the polyurethane foam, and sheathing the polyurethane foam-coated pipe in a layer of tough polymeric material.

2. A method of forming a tough thermally insulating coating on a pipe, which method comprises rotating the pipe at a uniform speed about a substantially horizontal axis while feeding the pipe uniformly in the direction of said axis past a spray nozzle, the spray nozzle being positioned to direct a spray onto an upper region of the pipe surface in a downwardly inclined direction, spraying a urethane foam mix from the nozzle to build up a uniform layer of polyurethane foam enveloping the pipe, foam, and sheathing the polyurethane foam-coated pipe in a layer of tough polymeric material.

3. A method of forming a tough thermally insulating coating on a pipe, which method comprises rotating the pipe at a uniform speed about a substantially horizontal axis while feeding the pipe uniformly in the direction of said axis past a spray nozzle, the nozzle being positioned for directing a spray onto an upper region of the pipe surface in a generally radial direction from an angle of at least 45° to the horizontal, spraying a urethane foam mix from the nozzle to build up a uniform layer of polyurethane foam enveloping the pipe, the pipe surface being maintained at a temperature in the range 115° F.–140° F., curing the polyurethane foam, coating the polyurethane foam layer with a self-sealing mastic, and bonding a layer of polymeric resin to the mastic layer to provide a tough outer sheath.

4. The method claimed in claim 1, wherein the pipe surface onto which the urethane foam is sprayed is maintained at a temperature in the range 125°–130° F.

5. The method claimed in claim 1, wherein the polyurethane foam layer is built up to a thickness of at least two inches.

6. The method claimed in claim 1, wherein the polyurethane foam layer has a density of about 3.9 to 4 lbs./cu. ft.

7. The method claimed in claim 1, wherein the urethane foam mix is sprayed onto the pipe surface from a plurality of spray nozzles, each of which is positioned for directing a spray onto an upper region of the pipe surface in a generally radial direction from an angle of at least 45° to the horizontal.

8. The method claimed in claim 1, wherein the material of the outer sheath is a high density polyolefin resin.

9. The method claimed in claim 1, wherein the material of the outer sheath is selected from the group comprising high density polyethylene, high density polypropylene, high density poly-4-methyl pentene-1, high density poly-1-hexene, and copolymers thereof.

10. A method of forming a tough thermally insulating coating on a pipe, which method comprises rotating the pipe at a uniform speed about a substantially horizontal axis while feeding the pipe uniformly in the direction of said axis past a spray nozzle, the nozzle being positioned for directing a spray onto an upper region of the pipe surface in a generally radial direction from an angle of at least 45° to the horizontal, spraying a urethane foam mix from the nozzle to build up a uniform layer of polyurethane foam enveloping the pipe, the pipe surface being maintained at temperature in the range 115° F.–140° F., curing the polyurethane foam, depositing a thermally insulating layer of a self-sealing mastic in a hot viscous state onto the polyurethane foam layer, and applying an outer layer of polymeric resin in the hot plastic state to the hot mastic layer to form a tough outer sheath which is bonded to the mastic layer.

11. The method claimed in claim 10, wherein the polymeric resin is a high density polyolefin resin.

12. The method claimed in claim 11, wherein the polymeric resin is selected from the group comprising high density polyethylene, high density polypropylene, high density poly-4-methyl pentene-1, high density poly-1-hexene, and copolymers thereof.

13. The method claimed in claim 12, wherein the mastic layer is applied to the polyurethane foam-coated pipe at a temperature in the range 270°–330° F., and the polymeric resin is applied to the mastic layer at a temperature in the range 400–650° F.

14. The method claimed in claim 13, wherein the polymeric resin is applied to the mastic layer at a temperature in the range 500°–550° F.

15. The method claimed in claim 10, wherein the mastic layer and outer layer are formed by rotating the polyurethane foam-coated pipe at a uniform speed about a substantially horizontal axis while feeding the pipe in the direction of said axis past a first station and a second station, applying the mastic at said first station at a temperature in the range 270°–330° F., extruding a continuous ribbon of the polymeric resin at said second station, at a temperature in the range 400° F.–650° F., and applying the ribbon as it is extruded to the hot mastic layer, the ribbon being wound helically around the pipe to form a continuous wrapping.

16. The method claimed in claim 1, wherein the urethane foam mix comprises an isocyanate component and a resin component in approximately equal proportions, the components being fed separately to the spray nozzle under pressure and mixed thereat, the components being sprayed from the spray nozzle at a temperature in the range 115°–140° F.

17. The method claimed in claim 16, wherein the isocyanate component is selected from the group of materials comprising tolylene diisocyanate, and methylene-bis-(4-diphenyl diisocyanate).

18. The method claimed in claim 17, wherein the resin component comprises a polyol selected from the group comprising polyesters and polyethers, a catalyst, a blowing agent and a surfactor, the catalyst, blowing agent and surfactor being present in the proportions 0.1–0.2%, 20–50%, and 0.1–2.0% by weight of the component, respectively.

19. The method claimed in claim 18, wherein the blowing agent is trichlorofluoromethane.

20. The method claimed in claim 19, wherein the catalyst is dibutyltin dilaurate.

21. The method claimed in claim 20, wherein the surfactor is a polyoxyalkylene-polydimethyl siloxane block copolymer.

22. The method claimed in claim 10, wherein the mastic is an ethylene propylene rubberised asphalt composition including a clay viscosity modifier, plasticisers, lubricant, antioxidant and a bacteriocidal agent.

References Cited

UNITED STATES PATENTS

| | | | |
|---|---|---|---|
| 3,012,585 | 12/1961 | O'Brien | 156—85 |
| 3,211,598 | 10/1965 | O'Brien | 156—85 |
| 3,402,742 | 9/1968 | O'Brien | 156—195 X |
| 3,446,684 | 5/1969 | Pall et al. | 156—193 X |
| 2,027,704 | 1/1936 | Rosener | 156—392 |
| 2,690,157 | 9/1954 | Perrault | 156—195 X |
| 2,828,798 | 4/1958 | Hopkins et al. | 156—195 X |
| 3,310,447 | 3/1967 | Matthews | 156—244 |
| 3,063,887 | 11/1962 | Labino | 156—184 X |
| 3,594,246 | 7/1971 | Arovelius | 156—195 X |
| 3,352,326 | 11/1967 | Gustafson | 138—149 |

CARL D. QUARFORTH, Primary Examiner

G. G. SOLYST, Assistant Examiner

U.S. Cl. X.R.

156—188, 192, 195, 392